(12) United States Patent
Watanabe

(10) Patent No.: US 11,686,700 B2
(45) Date of Patent: Jun. 27, 2023

(54) GAS SENSOR

(71) Applicant: NGK INSULATORS, LTD., Aichi (JP)

(72) Inventor: Yusuke Watanabe, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 642 days.

(21) Appl. No.: 16/701,185

(22) Filed: Dec. 3, 2019

(65) Prior Publication Data

US 2020/0191744 A1 Jun. 18, 2020

(30) Foreign Application Priority Data

Dec. 12, 2018 (JP) .................................. 2018-232677

(51) Int. Cl.
G01N 27/407 (2006.01)
G01N 27/419 (2006.01)
(Continued)

(52) U.S. Cl.
CPC ....... *G01N 27/4072* (2013.01); *G01N 27/301* (2013.01); *G01N 27/409* (2013.01);
(Continued)

(58) Field of Classification Search
CPC ............. G01N 27/4072; G01N 27/301; G01N 27/4073; G01N 27/4077; G01N 27/409;
(Continued)

(56) References Cited

U.S. PATENT DOCUMENTS

2006/0137979 A1* 6/2006 Strassner ........... G01N 27/4075
204/431
2012/0211362 A1* 8/2012 Onkawa ............. G01N 27/4077
204/424
(Continued)

FOREIGN PATENT DOCUMENTS

DE 10043089 A1 * 3/2002 ........... G01N 27/407
JP 2011214853 A * 10/2011
JP 2015-200643 A 11/2015

OTHER PUBLICATIONS

Wiedenmann et al. (DE 10043089 A1, Machine Translation) (Year: 2002).*

(Continued)

*Primary Examiner* — Joshua L Allen
(74) *Attorney, Agent, or Firm* — Mattingly & Malur, PC

(57) ABSTRACT

A gas sensor includes an element body having an oxygen ion conductive solid electrolyte layer and internally provided with a measurement-object gas flow section that introduces a measurement-object gas and allows the gas to flow; a measurement-object gas-side electrode disposed in a portion of the element body, the portion being exposed to the measurement-object gas; and a reference electrode disposed inside of the element body. Let A [µA] be a limiting current when oxygen is pumped from the surroundings of the measurement-object gas-side electrode to the surroundings of the reference electrode with the measurement-object gas introduction section, and B [µA] be a limiting current when oxygen is pumped from the surroundings of the reference (Continued)

electrode to the surroundings of the measurement-object gas-side electrode with the reference gas introduction section, then a ratio A/B is greater than or equal to 0.005.

20 Claims, 3 Drawing Sheets

(51) Int. Cl.
G01N 27/30 (2006.01)
G01N 27/41 (2006.01)
G01N 27/409 (2006.01)

(52) U.S. Cl.
CPC ..... *G01N 27/4073* (2013.01); *G01N 27/4077* (2013.01); *G01N 27/41* (2013.01); *G01N 27/419* (2013.01)

(58) Field of Classification Search
CPC ............. G01N 27/419; G01N 27/4074; G01N 27/4067; G01N 27/4078; G01N 27/406–41; G01N 33/0004–0075
See application file for complete search history.

(56) References Cited

U.S. PATENT DOCUMENTS

2015/0276659 A1* 10/2015 Sekiya ............... G01N 27/4071
204/416
2016/0223487 A1* 8/2016 Okamoto ........... G01N 27/4074
2017/0284958 A1* 10/2017 Watanabe .......... G01N 27/4074

OTHER PUBLICATIONS

Watanabe et al. (JP 2011214853 A, Machine Translation). (Year: 2011).*

* cited by examiner

GAS SENSOR

The present application claims priority from Japanese Patent Application No. 2018-232677 filed on Dec. 12, 2018, the entire contents of which are incorporated herein by reference.

BACKGROUND OF THE INVENTION

1. Field of the Invention

The present invention relates to a gas sensor.

2. Description of the Related Art

A conventional gas sensor has been known which detects a concentration of a specific gas such as NOx in a measurement-object gas, such as exhaust gas of automobiles. For instance, PTL 1 describes a gas sensor including: a layered body in which multiple oxygen ion conductive solid electrolyte layers are layered; a reference electrode which is formed inside of the layered body and into which a reference gas is introduced from reference gas introduction space; a measurement electrode disposed in a measurement-object gas flow section inside of the layered body; and a measurement-object gas-side electrode disposed in a portion of the layered body, the portion being exposed to a measurement-object gas. The gas sensor detects a specific gas concentration in the measurement-object gas based on an electromotive force generated between the reference electrode and the measurement electrode. In addition, the gas sensor includes a reference gas adjustment device that carries a control current between the reference electrode and the measurement-object gas-side electrode, and pumps oxygen into the surroundings of the reference electrode. PTL 1 describes that pumping oxygen into the surroundings of the reference electrode by the reference gas adjustment device makes it possible to compensate for the reduction of the oxygen concentration in the reference gas in the surroundings of the reference electrode, and decrease in the accuracy of detection of the specific gas concentration is reduced. It is to be noted that the reduction of the oxygen concentration in the reference gas in the surroundings of the reference electrode refers to the case where the measurement-object gas slightly enters the reference gas introduction space, for instance.

CITATION LIST

Patent Literature

PTL 1: JP 2015-200643 A

SUMMARY OF THE INVENTION

However, even when the oxygen in the surroundings of the measurement-object gas-side electrode is pumped into the surroundings of the reference electrode, the amount of oxygen pumped may be insufficient, and the oxygen concentration in the reference gas in the surroundings of the reference electrode may be reduced.

The present invention has been devised to solve such as a problem, and it is the main object to decrease reduction in the oxygen concentration in the surroundings of the reference electrode.

The present invention adopts the following solution to achieve the main object described above.

A gas sensor comprising:

an element body having an oxygen ion conductive solid electrolyte layer and internally provided with a measurement-object gas flow section that introduces a measurement-object gas and allows the gas to flow;

a measurement electrode disposed on an inner surface of the measurement-object gas flow section;

a measurement-object gas-side electrode disposed in a portion of the element body, the portion being exposed to the measurement-object gas;

a reference electrode disposed inside of the element body;

a measurement-object gas introduction section that introduces the measurement-object gas, and allows the measurement-object gas to flow to the measurement-object gas-side electrode;

a reference gas introduction section that introduces a reference gas serving as a reference for detection of a specific gas concentration in the measurement-object gas, and allows the reference gas to flow to the reference electrode;

a detection device that detects the specific gas concentration in the measurement-object gas based on an electromotive force generated between the reference electrode and the measurement electrode; and a reference gas adjustment device that carries an oxygen pumping current between the reference electrode and the measurement-object gas-side electrode, and pumps oxygen from surroundings of the measurement-object gas-side electrode into surroundings of the reference electrode.

Let A [μA] be a limiting current when oxygen is pumped from the surroundings of the measurement-object gas-side electrode to the surroundings of the reference electrode with the measurement-object gas introduction section exposed to an atmosphere having an oxygen concentration of 1000 ppm, and B [μA] be a limiting current when oxygen is pumped from the surroundings of the reference electrode to the surroundings of the measurement-object gas-side electrode with the reference gas introduction section exposed to an air atmosphere, then a ratio A/B is greater than or equal to 0.005.

In the gas sensor, oxygen is pumped into the surroundings of the reference electrode by carrying an oxygen pumping current between the reference electrode and the measurement-object gas-side electrode. This can compensate for the reduction of the oxygen concentration in the surroundings of the reference electrode when the measurement-object gas enters the reference gas introduction section, for instance. In the gas sensor, the ratio A/B is greater than or equal to 0.005, where A is the limiting current when oxygen is pumped from the surroundings of the measurement-object gas-side electrode to the surroundings of the reference electrode, and B is the limiting current when oxygen is pumped from the surroundings of the reference electrode to the surroundings of the measurement-object gas-side electrode. Here, the limiting current A has a negative correlation with the diffusion resistance of the measurement-object gas introduction section. Also, the limiting current B has a negative correlation with the diffusion resistance of the reference gas introduction section. In the gas sensor, since the ratio A/B is greater than or equal to 0.005, the diffusion resistance of the measurement-object gas introduction section is not too high and the diffusion resistance of the reference gas introduction section is not too low, thus the oxygen concentration in the surroundings of the reference electrode is unlikely to be reduced.

In this case, the measurement-object gas-side electrode may be disposed outwardly of the element body, or disposed on the inner surface of the measurement-object gas flow section and on the upstream side of the measurement-object gas relative to the measurement electrode.

In the gas sensor of the present invention, the ratio A/B may be greater than or equal to 0.4. In this setting, the oxygen concentration in the reference gas in the surroundings of the reference electrode is unlikely to be reduced in the gas sensor.

In the gas sensor of the present invention, the ratio A/B may be less than or equal to 125. In this setting, it is possible to avoid an excessively high oxygen concentration in the reference gas in the surroundings of the reference electrode due to over accumulation of the oxygen pumped into the surroundings of the reference electrode. In this case, the ratio A/B may be less than or equal to 25.

In the gas sensor of the present invention, the limiting current A may be 1 µA to 10000 µA. When the limiting current A is higher than or equal to 1 µA, the ratio A/B is easily adjusted to 0.005 or higher. When the limiting current A is lower than or equal to 10000 µA, the ratio A/B is easily adjusted to 125 or lower.

In the gas sensor of the present invention, the limiting current B may be 8 µA to 200 µA. When the limiting current B is higher than or equal to 8 µA, the ratio A/B is easily adjusted to 125 or lower. When the limiting current B is lower than or equal to 200 µA, the ratio A/B is easily adjusted to 0.005 or higher.

In the gas sensor of the present invention, let C [mm$^2$] be the area of the measurement-object gas-side electrode, and D [mm$^2$] be the area of the reference electrode, then the area C may be greater than or equal to 1.0 mm$^2$, the area D may be greater than or equal to 0.5 mm$^2$, and the ratio C/D may be greater than or equal to 1 and less than or equal to 20. Here, the area C has a negative correlation with the resistance value of the measurement-object gas-side electrode. Also, the area D has a negative correlation with the resistance value of the reference electrode. Since the area C is greater than or equal to 1.0 mm$^2$, the resistance value of the measurement-object gas-side electrode is not too high. Since the area D is greater than or equal to 0.5 mm$^2$, the resistance value of the reference electrode is not too high. Since the ratio C/D is greater than or equal to 1, the resistance value of the measurement-object gas-side electrode is not too high relative to the resistance value of the reference electrode. Since the ratio C/D is less than or equal to 20, the resistance value of the reference electrode is not too high relative to the resistance value of the measurement-object gas-side electrode. Thus, since the area C is greater than or equal to 1.0 mm$^2$, the area D is greater than or equal to 0.5 mm$^2$, and the ratio C/D is greater than or equal to 1 and less than or equal to 20, the reference gas adjustment device easily carries an appropriate oxygen pumping current.

In the gas sensor in an aspect of the present invention, where the ratio C/D is greater than or equal to 1 and less than or equal to 20, the area C may be less than or equal to 15.0 mm$^2$. When the area C is less than or equal to 15.0 mm$^2$, the ratio C/D is easily adjusted to 20 or less.

In the gas sensor in an aspect of the present invention, where the ratio C/D is greater than or equal to 1 and less than or equal to 20, the area D may be less than or equal to 4.0 mm$^2$. When the area D is less than or equal to 4.0 mm$^2$, the ratio C/D is easily adjusted to 1 or greater.

In the gas sensor of the present invention, the measurement-object gas introduction section may have a porous protective layer that covers part of the element body, the reference gas introduction section may have a porous reference gas introduction layer, the porosity of the porous protective layer may be greater than or equal to 20% and less than or equal to 60%, and the porosity of the reference gas introduction layer may be greater than or equal to 15% and less than or equal to 50%.

DETAILED DESCRIPTION OF THE INVENTION

Figure 1:
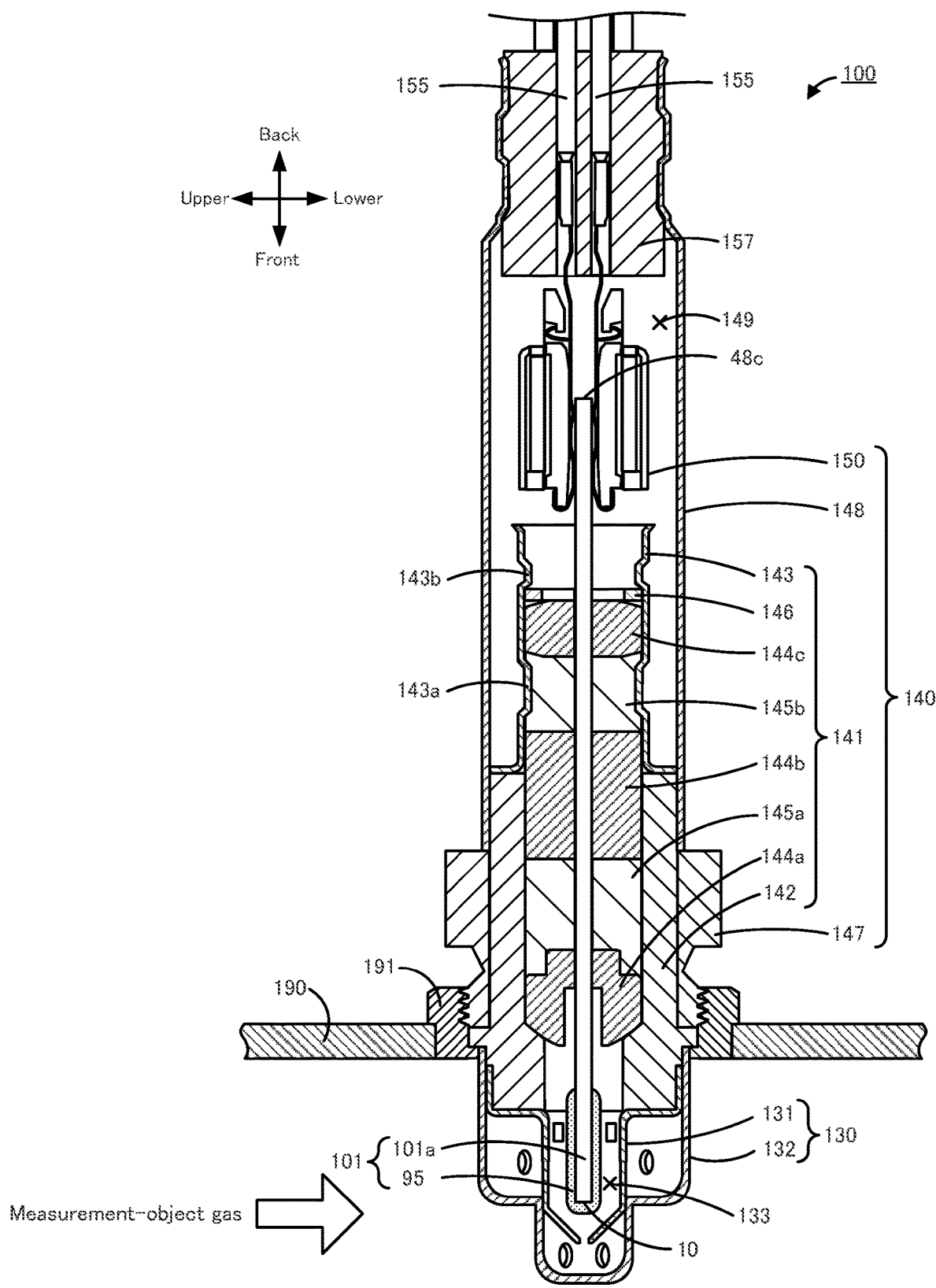
FIG. 1 is a vertical cross-sectional view of a gas sensor 100.
Figure 2:
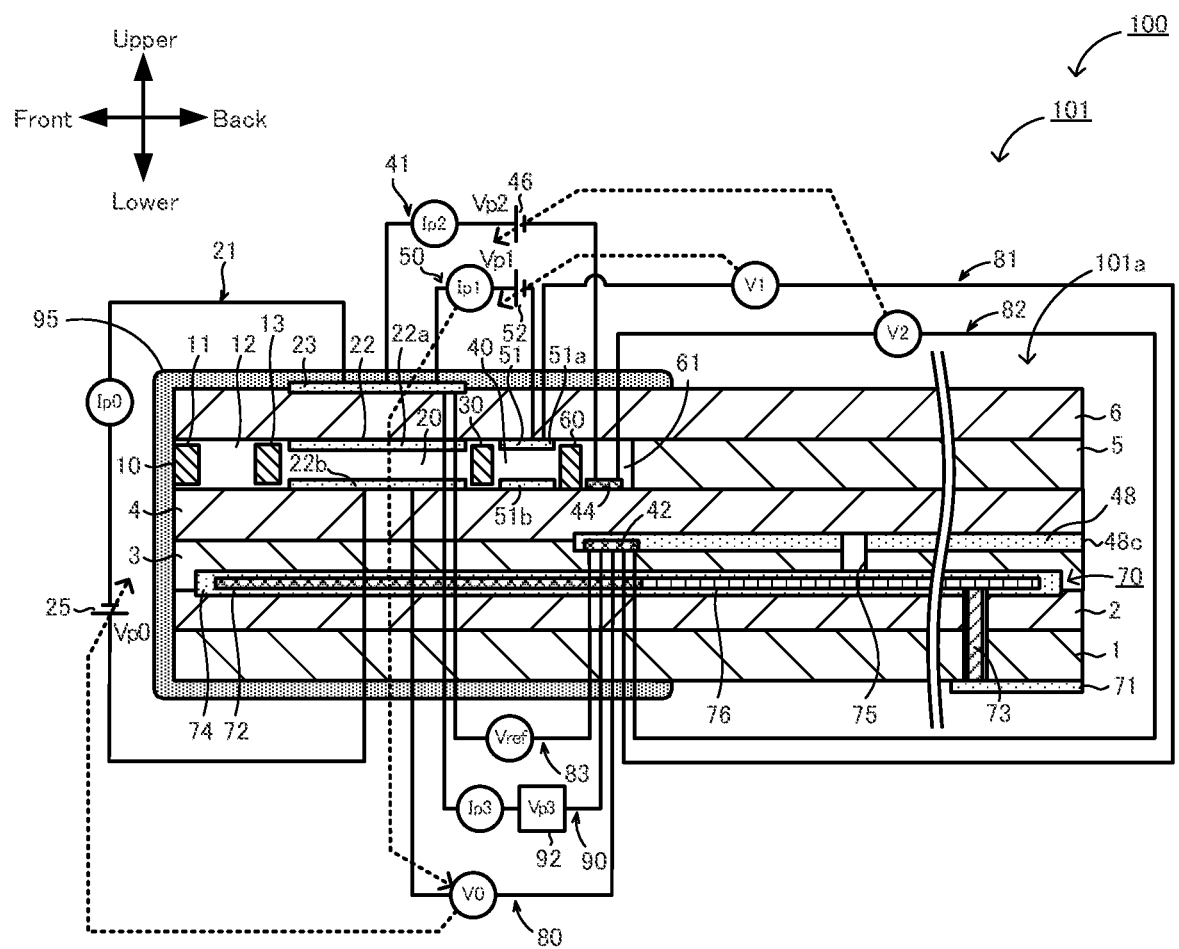
FIG. 2 is a schematic cross-sectional view illustrating an example of the configuration of a sensor device 101.

Next, an embodiment of the present invention will be described using the drawings. FIG. 1 is a vertical cross-sectional view of a gas sensor 100 of the present invention, and FIG. 2 is a schematic cross-sectional view schematically illustrating an example of the configuration of a sensor device 101 included in the gas sensor 100. The sensor device 101 has an elongated rectangular parallelepiped shape, the longitudinal direction (the horizontal direction of FIG. 2) of the sensor device 101 is the front-back direction, and the depth direction (the vertical direction of FIG. 2) of the sensor device 101 is the vertical direction. Also, the width direction (the direction perpendicular to the front-back direction and the vertical direction) is the horizontal direction.

As illustrated in FIG. 1, the gas sensor 100 includes the sensor device 101, a protective cover 130 that protects the front end side of the sensor device 101, and a sensor assembled body 140 including a connector 150 which is electrically connected to the sensor device 101. As illustrated, the gas sensor 100 is mounted, for instance, on a pipe 190 such as an exhaust gas pipe of a vehicle, and is used to measure the concentration of a specific gas (NOx in this embodiment) contained in an exhaust gas provided as a measurement-object gas. The sensor device 101 includes an element body 101a, and a porous protective layer 95 that covers part of the element body 101a.

The protective cover 130 includes a bottomed cylindrical inner-side protective cover 131 that covers the front end of the sensor device 101, and a bottomed cylindrical outer-side protective cover 132 that covers the inner-side protective cover 131. In the inner-side protective cover 131 and the outer-side protective cover 132, multiple holes are formed for allowing a measurement-object gas to flow into the protective cover 130. A sensor device chamber 133 is formed as the space surrounded by the inner-side protective cover 131, and the front end of the sensor device 101 is disposed in the sensor device chamber 133.

The sensor assembled body 140 includes a device sealing body 141 that seals and fixes the sensor device 101, a nut 147, an outer tube 148 which are mounted on the device sealing body 141, and a connector 150 which is in contact with and electrically connected to connector electrodes (only the later-described heater connector 71 is illustrated in FIG. 2), the connector electrodes being formed on the surface (vertical surface) of the rear end of the sensor device 101 and not illustrated.

The device sealing body 141 includes a tubular main metal fittings 142, a tubular inner tube 143 coaxially welded and fixed to the main metal fittings 142, ceramic supporters 144a to 144c, green pellets 145a, 145b, and a metal ring 146 which are sealed in through holes inside of the main metal fittings 142 and the inner-tube 143. The sensor device 101 is located on the central axis of the device sealing body 141, and penetrates the device sealing body 141 in the front-back direction. In the inner-tube 143, a reduced diameter section 143a for pressing the green pellet 145b in the central axial direction of the inner tube 143, and a reduced diameter section 143b for pressing the ceramic supporters 144a to 144c, the green pellets 145a, 145b via the metal ring 146 forward are formed. The green pellets 145a, 145b are compressed between the main metal fittings 142, the inner tube 143, and the sensor device 101 by a pressing force from the reduced diameter sections 143a, 143b, thus the green pellets 145a, 145b seal between the sensor device chamber 133 within the protective cover 130 and space 149 within the outer tube 148, as well as fix the sensor device 101.

The nut 147 is coaxially fixed to the main metal fittings 142, and a male screw section is formed on the outer circumferential surface. The male screw section of the nut 147 is inserted in a fixing member 191 which is welded to the pipe 190 and includes a female screw section on the inner circumferential surface. Thus, the gas sensor 100 is fixed to the pipe 190 with the front end of the sensor device 101 and the protective cover 130 portion of the gas sensor 100 projecting into the pipe 190.

The outer tube 148 covers the surroundings of the inner tube 143, the sensor device 101, and the connector 150, and multiple lead wires connected to the connector 150 are drawn from the rear end to the outside. The lead wires 155 are electrically connected to the electrodes (described later) of the sensor device 101 via the connector 150. The gap between the outer tube 148 and the lead wires 155 is sealed with a rubber stopper 157. The space 149 within the outer tube 148 is filled with a reference gas (air in this embodiment). The rear end of the sensor device 101 is disposed in the space 149.

As illustrated in FIG. 2, the sensor device 101 is a device having a layered body in which six layers: a first substrate layer 1, a second substrate layer 2, a third substrate layer 3, a first solid electrolyte layer 4, a spacer layer 5, and a second solid electrolyte layer 6 are layered in that order in the drawing view from the lower side, the layers each being an oxygen ion conductive solid electrolyte layer such as zirconia ($ZrO_2$). Also, the solid electrolyte forming these six layers is extremely airtight. Such sensor device 101 is manufactured, for instance, by performing predetermined processing and printing a circuit pattern on each of ceramic green sheets corresponding to the layers, layering the sheets, and further calcining and integrating the sheets.

At one leading end (an end in the front direction) of the sensor device 101, between the lower surface of the second solid electrolyte layer 6 and the upper surface of the first solid electrolyte layer 4, a gas introduction port 10, a first diffusion control section 11, a buffer space 12, a second diffusion control section 13, a first internal space 20, a third diffusion control section 30, a second internal space 40, a fourth diffusion control section 60, and a third internal space 61 are adjacently formed in a manner allowing communication with each other in that order.

The gas introduction port 10, the buffer space 12, the first internal space 20, the second internal space 40, and the third internal space 61 are internal space of the sensor device 101, the internal space being provided in a manner in which the spacer layer 5 is bored, and having the upper part, the lower part, and the lateral part demarcated by the lower surface of the second solid electrolyte layer 6, the upper surface of the first solid electrolyte layer 4, and the lateral surface of the spacer layer 5, respectively.

The first diffusion control section 11, the second diffusion control section 13, and the third diffusion control section 30 are each provided as two horizontally long slits (its opening has a longitudinal direction in the direction perpendicular to FIG. 2). The fourth diffusion control section 60 is provided as one horizontally long slit (its opening has a longitudinal direction in the direction perpendicular to FIG. 2) which is formed as the gap with the lower surface of the second solid electrolyte layer 6. It is to be noted that the section from the gas introduction port 10 to the third internal space 61 is also referred to as the measurement-object gas flow section.

An air introduction layer 48 is provided between the upper surface of the third substrate layer 3 and the lower surface of the first solid electrolyte layer 4. The air introduction layer 48 is a porous body comprised of ceramics such as alumina, for instance. The air introduction layer 48 has an inlet section 48c at the rear end face, and the inlet section 48c is exposed to the rear end face of the sensor device 101. The inlet section 48c is exposed to the space 149 of FIG. 1 (see FIG. 1). A reference gas for measuring the NOx concentration is introduced into the air introduction layer 48 through the inlet section 48c. The reference gas is air (the atmosphere in the space 149 of FIG. 1) in this embodiment. Also, the air introduction layer 48 is formed so as to cover the reference electrode 42. The air introduction layer 48 gives a predetermined diffusion resistance to the reference gas introduced through the inlet section 48c, and introduces the reference gas to the reference electrode 42.

The reference electrode 42 is an electrode formed in a manner to be interposed between the upper surface of the third substrate layer 3 and the first solid electrolyte layer 4, and as described above, the surroundings of the electrode is provided with the air introduction layer 48. The reference electrode 42 is directly formed on the upper surface of the third substrate layer 3, and all but the portion of the reference electrode 42 in contact with the upper surface of the third substrate layer 3 is covered by the air introduction layer 48. Also, as described later, it is possible to measure the oxygen concentration (oxygen partial pressure) in each of the first internal space 20, the second internal space 40, and the third internal space 61 using the reference electrode 42. The reference electrode 42 is formed as a porous cermet electrode (for instance, a cermet electrode composed of Pt and $ZrO_2$). Without being particularly limited to this, the reference electrode 42 has a length of, for instance, 0.2 to 2 mm in the front-back direction, a width of, for instance, 0.2 to 2.5 mm in the horizontal direction, and a thickness of, for instance, 5 to 30 mm.

In the measurement-object gas flow section, the gas introduction port 10 is a part opened to the external space, and a measurement-object gas is designed to be taken into the sensor device 101 from the external space through the gas introduction port 10. The first diffusion control section 11 is a section that gives a predetermined diffusion resistance to the measurement-object gas taken through the gas introduction port 10. The buffer space 12 is space which is provided for introducing the measurement-object gas, which has been introduced by the first diffusion control section 11, to the second diffusion control section 13. The second diffusion control section 13 is a section that gives a predetermined diffusion resistance to the measurement-object gas which is introduced from the buffer space 12 to the first internal space 20. When the measurement-object gas is introduced from the outside of the sensor device 101 into the first internal space 20, the measurement-object gas quickly taken to the inside of the sensor device 101 through the gas introduction port 10 by the pressure variation (pulsation of the exhaust pressure when the measurement-object gas is an exhaust gas of an automobile) of the measurement-object gas in the external space is not directly introduced to the first internal space 20, but the pressure variation of the measurement-object gas is cancelled through the first diffusion control section 11, the buffer space 12, and the second diffusion control section 13, then the measurement-object gas is introduced to the first internal space 20. Consequently, the pressure variation of the measurement-object gas introduced to the first internal space 20 is almost negligible. The first internal space 20 is provided as space for adjusting the oxygen partial pressure in the measurement-object gas introduced through the second diffusion control section 13. Such oxygen partial pressure is adjusted by the operation of a main pump cell 21.

The main pump cell 21 is an electrochemical pump cell including an inner side pump electrode 22 having a ceiling electrode section 22$a$ which is provided on substantially the entire lower surface of the second solid electrolyte layer 6 facing the first internal space 20; an outer side pump electrode 23 provided in a manner which allows exposure to the external space (the sensor device chamber 133 of FIG. 1) in a region, corresponding to the ceiling electrode section 22$a$, of the upper surface of the second solid electrolyte layer 6; and the second solid electrolyte layer 6 interposed between these electrodes.

The inner side pump electrode 22 is formed across the upper and lower solid electrolyte layers (the second solid electrolyte layer 6 and the first solid electrolyte layer 4) which demarcate the first internal space 20, and the spacer layer 5 which provides the lateral wall. Specifically, the ceiling electrode section 22$a$ is formed in the lower surface of the second solid electrolyte layer 6 which provides the ceiling surface of the first internal space 20, a bottom electrode section 22$b$ is directly formed in the upper surface of the first solid electrolyte layer 4 which provides the bottom surface, a lateral electrode section (not illustrated) is formed in the lateral wall surface (inner surface) of the spacer layer 5 constituting the both side wall sections of the first internal space 20 so that the ceiling electrode section 22$a$ and the bottom electrode section 22$b$ are connected, and these sections are disposed in a structure as a tunnel form at the disposition position of the lateral electrode section.

The inner side pump electrode 22 and the outer side pump electrode 23 are each formed as a porous cermet electrode (for instance, a cermet electrode composed of Pt containing 1% of Au and $ZrO_2$). It is to be noted that the inner side pump electrode 22 in contact with the measurement-object gas is formed using a material having a weakened reducing ability against the NOx content in the measurement-object gas.

In the main pump cell 21, a desired pump voltage Vp0 is applied between the inner side pump electrode 22 and the outer side pump electrode 23 to cause a pump current Ip0 to flow in the positive direction or the negative direction between the inner side pump electrode 22 and the outer side pump electrode 23, thereby making it possible to pump the oxygen in the first internal space 20 out to the external space, or pump the oxygen in the external space into the first internal space 20.

Also, in order to detect the oxygen concentration (oxygen partial pressure) in the atmosphere in the first internal space 20, an electrochemical sensor cell, specifically, a oxygen partial pressure detection sensor cell 80 for main pump control is provided, which includes the inner side pump electrode 22, the second solid electrolyte layer 6, the spacer layer 5, the first solid electrolyte layer 4, the third substrate layer 3, and the reference electrode 42.

The oxygen concentration (oxygen partial pressure) in the first internal space 20 is known by measuring an electromotive force V0 in the oxygen partial pressure detection sensor cell 80 for main pump control. In addition, the pump current Ip0 is controlled by performing feedback control on the pump voltage Vp0 of a variable power supply 25 so that the electromotive force is constant. Thus, the oxygen concentration in the first internal space 20 can be maintained at a predetermined constant value.

The third diffusion control section 30 is a section that gives a predetermined diffusion to the measurement-object gas for which the oxygen concentration (oxygen partial pressure) is controlled by the operation of the main pump cell 21 in the first internal space 20, and introduces the measurement-object gas into the second internal space 40.

The second internal space 40 is provided as space for further adjusting the oxygen partial pressure of a measurement-object gas by an auxiliary pump cell 50, the gas having been introduced through the third diffusion control section 30 after the oxygen concentration (oxygen partial pressure) is adjusted in advance in the first internal space 20. Consequently, the oxygen concentration in the second internal space 40 can be maintained constant with high accuracy, thereby making it possible to measure the NOx concentration with high accuracy by the gas sensor 100.

The auxiliary pump cell 50 is an auxiliary electrochemical pump cell including an auxiliary pump electrode 51 having a ceiling electrode section 51$a$ provided on substantially the entire lower surface of the second solid electrolyte layer 6 facing the second internal space 40; the outer side pump electrode 23 (is not restricted to the outer side pump electrode 23, but an appropriate electrode outside of the sensor device 101 suffices); and the second solid electrolyte layer 6.

Such auxiliary pump electrode 51 is disposed in the second internal space 40 in a structure as a tunnel form similar to that of the inner side pump electrode 22 provided in the first internal space 20 mentioned earlier. Specifically, the ceiling electrode section 51$a$ is formed for the second solid electrolyte layer 6 which provides the ceiling surface of the second internal space 40, a bottom electrode section 51$b$ is directly formed on the upper surface of the first solid electrolyte layer 4 which provides the bottom surface of the second internal space 40, and a lateral electrode section (not illustrated) connecting the ceiling electrode section 51$a$ and the bottom electrode section 51$b$ is formed on each of both wall surfaces of the spacer layer 5 which provides the lateral wall of the second internal space 40, and has a structure of a tunnel form. It is to be noted that similarly to the inner side pump electrode 22, the auxiliary pump electrode 51 is also formed using a material having a weakened reducing ability against the NOx content in the measurement-object gas.

In the auxiliary pump cell 50, it possible to pump the oxygen in the atmosphere in the second internal space 40 out to the external space, or pump the oxygen in the external space into the second internal space 40 by applying a desired voltage Vp1 across the auxiliary pump electrode 51 and the outer side pump electrode 23.

In addition, in order to control the oxygen partial pressure in the atmosphere in the second internal space 40, an electrochemical sensor cell, specifically, an oxygen partial pressure detection sensor cell 81 for auxiliary pump control is provided, which includes the auxiliary pump electrode 51, the reference electrode 42, the second solid electrolyte layer 6, the spacer layer 5, the first solid electrolyte layer 4, and the third substrate layer 3.

It is to be noted that the auxiliary pump cell 50 performs pumping with a variable power supply 52 for which the voltage is controlled based on an electromotive force V1 detected by the oxygen partial pressure detection sensor cell 81 for auxiliary pump control. Thus, the oxygen partial pressure in the atmosphere in the second internal space 40 is controlled at a low partial pressure which has essentially no effect on the measurement of NOx.

Along with this, a pump current Ip1 is used for controlling the electromotive force of the oxygen partial pressure detection sensor cell 80 for main pump control. Specifically, the pump current Ip1 is inputted to the oxygen partial pressure detection sensor cell 80 for main pump control as a control signal, and the electromotive force V0 is controlled so that the gradient of the oxygen partial pressure of the measurement-object gas introduced from the third diffusion control section 30 into the second internal space 40 is always controlled constant. When the oxygen partial pressure detection sensor cell 80 for main pump control used as a NOx sensor, the oxygen concentration in the second internal space 40 is maintained at a constant value of approximately 0.001 ppm by the function of the main pump cell 21 and the auxiliary pump cell 50.

The fourth diffusion control section 60 is a section that gives a predetermined diffuse resistance to the measurement-object gas for which the oxygen concentration (oxygen partial pressure) is controlled by the operation of the auxiliary pump cell 50 in the second internal space 40, and introduces the measurement-object gas to the third internal space 61. The fourth diffusion control section 60 has a function of limiting the amount of NOx flown into the third internal space 61.

The third internal space 61 is provided as space for performing processing related to measurement of the nitrogen oxide (NOx) concentration in a measurement-object gas, the gas having been introduced through the fourth diffusion control section 60 after the oxygen concentration (oxygen partial pressure) is adjusted in advance in the second internal space 40. The measurement of the NOx concentration is performed by the operation of a pump cell 41 for measurement mainly in the third internal space 61.

The pump cell 41 for measurement measures the NOx concentration in a measurement-object gas in the third internal space 61. The pump cell 41 for measurement is an electrochemical pump cell including a measurement electrode 44 directly provided on the upper surface of the first solid electrolyte layer 4 facing the third internal space 61, the outer side pump electrode 23, the second solid electrolyte layer 6, the spacer layer 5, and the first solid electrolyte layer 4. The measurement electrode 44 is a porous cermet electrode. The measurement electrode 44 also functions as a NOx reducing catalyst which reduces NOx present in the atmosphere in the third internal space 61.

The pump cell 41 for measurement can pump oxygen generated by decomposition of nitrogen oxide in the atmosphere of the surroundings of the measurement electrode 44, and can detect the amount of generation as a pump current Ip2.

Also, in order to detect the oxygen partial pressure in the surroundings of the measurement electrode 44, an oxygen partial pressure detection sensor cell 82 for measurement pump control is provided, which includes the first solid electrolyte layer 4, the third substrate layer 3, the measurement electrode 44, and the reference electrode 42. A variable power supply 46 is controlled based on an electromotive force V2 detected by the oxygen partial pressure detection sensor cell 82 for measurement pump control.

The measurement-object gas introduced into the second internal space 40 arrives at the measurement electrode 44 of the third internal space 61 through the fourth diffusion control section 60 in a situation where the oxygen partial pressure is controlled. The nitrogen oxide in the measurement-object gas in the surroundings of the measurement electrode 44 is reduced ($2NO \rightarrow N_2 + O_2$), and oxygen is generated. The generated oxygen is pumped by the pump cell 41 for measurement, and at that time, a voltage Vp2 of the variable power supply 46 is controlled so that the electromotive force V2 detected by the oxygen partial pressure detection sensor cell 82 for measurement pump control is maintained constant. The amount of oxygen generated in the surroundings of the measurement electrode 44 is proportional to the concentration of the nitrogen oxide in the measurement-object gas, thus the nitrogen oxide concentration in the measurement-object gas is calculated using the pump current Ip2 in the pump cell 41 for measurement.

Also, an electrochemical sensor cell 83 includes the second solid electrolyte layer 6, the spacer layer 5, the first solid electrolyte layer 4, the third substrate layer 3, the outer side pump electrode 23, and the reference electrode 42. The oxygen partial pressure in the measurement-object gas outside of the sensor is detectable by an electromotive force Vref obtained by the sensor cell 83.

In addition, an electrochemical reference gas adjustment pump cell 90 includes the second solid electrolyte layer 6, the spacer layer 5, the first solid electrolyte layer 4, the third substrate layer 3, the outer side pump electrode 23, and the reference electrode 42. The electrochemical reference gas adjustment pump cell 90 performs pumping by carrying a control current (oxygen pumping current) Ip3 caused by a control voltage Vp3 applied by a power supply circuit 92 connected between the outer side pump electrode 23 and the reference electrode 42. Thus, the reference gas adjustment pump cell 90 pumps oxygen from the space (the sensor device chamber 133 of FIG. 1) in the surroundings of the outer side pump electrode 23 to the surroundings of the reference electrode 42.

In the gas sensor 100 having such a configuration, a measurement-object gas having an oxygen partial pressure maintained at a constant low value (a value essentially having no effect on the measurement of NOx) all the time is provided to the pump cell 41 for measurement by operating the main pump cell 21 and the auxiliary pump cell 50. Thus, the NOx concentration in the measurement-object gas can be known based on the pump current Ip2 which is carried by pumping oxygen by the pump cell 41 for measurement, the oxygen being substantially proportional to the concentration of the NOx in the measurement-object gas and generated by reducing of the NOx.

In addition, the sensor device 101 includes a heater unit 70 that has a function of temperature adjustment through heating the sensor device 101 and maintaining the temperature in order to enhance the oxygen ion conductivity of the solid electrolyte. The heater unit 70 includes a heater connector electrode 71, a heater 72, a through hole 73, a heater insulation layer 74, a pressure diffusion hole 75, and a lead wire 76.

The heater connector electrode 71 is an electrode formed in a manner to allow connection to the lower surface of the first substrate 1. It is possible to supply electric power to the heater unit 70 from the outside by connecting the heater connector electrode 71 to an external power supply.

The heater 72 is an electrical resistor formed in a manner to be interposed vertically between the second substrate layer 2 and the third substrate layer 3. The heater 72 is connected to the heater connector electrode 71 via the lead wire 76 and the through hole 73, is heated by electric supply from the electrolyte outside through the heater connector electrode 71, and performs heating and temperature maintenance of the solid forming the sensor device 101.

Also, the heater 72 is embedded across the entire area from the first internal space 20 to the third internal space 61, and can adjust the entire sensor device 101 to a temperature which causes the solid electrolyte to be activated.

The heater insulation layer 74 is an insulation layer including porous alumina composed of an insulator such as alumina. The heater insulation layer 74 is formed for the purpose of obtaining electrical insulation between the second substrate layer 2 and the heater 72 and electrical insulation between the third substrate layer 3 and the heater 72.

The pressure diffusion hole 75 is a section provided to penetrate the third substrate layer 3 and the air introduction layer 48, and is formed for the purpose of reducing the increase of an internal pressure in association with temperature rise in the heater insulation layer 74.

It is to be noted that the variable power supplies 25, 46, 52 illustrated in FIG. 2 are actually connected to electrodes via lead wires (not illustrated) formed in the sensor device 101 and the connector 150 and the lead wires 155 of FIG. 1.

As illustrated in FIGS. 1, 2, part (here, the front end part of the element body 101*a*) of the element body 101*a* is covered by the porous protective layer 95. As illustrated in FIG. 2, the porous protective layer 95 covers part of the upper surface and the lower surface of the element body 101*a*, and although illustration is omitted, the porous protective layer 95 also covers part of the left surface and the right surface of the element body 101*a*. The porous protective layer 95 covers the front face of the front end surface. The porous protective layer 95 covers the outer side pump electrode 23. The porous protective layer 95 also covers the gas introduction port 10. Since the porous protective layer 95 is a porous body, the measurement-object gas in the sensor device chamber 133 can reach the outer side pump electrode 23 or the gas introduction port 10 by flowing through the inside of the porous protective layer 95. Thus, the porous protective layer 95 functions as a measurement-object gas introduction section that introduces a measurement-object gas from the outside (here, the sensor device chamber 133), and allows the gas to flow to the outer side pump electrode 23. The porous protective layer 95 covers part of the element body 101*a*, and protects the part. The porous protective layer 95 has a function of protecting against occurrence of cracking of the element body 101*a* due to adherence of water in the measurement-object gas to the element body 101*a*, for instance. In addition, the porous protective layer 95 has a function of avoiding adherence of poisoning substances, such as oil content in the measurement-object gas, to the outer side pump electrode 23, and reducing degradation of the outer side pump electrode 23.

The porous protective layer 95 is a porous body containing ceramic particles as the constituent particles. In this embodiment, the porous protective layer 95 is assumed to be composed of an alumina porous material. The porosity of the porous protective layer 95 is, for instance, greater than or equal to 20% and less than or equal to 60%. The thickness of the porous protective layer 95 is, for instance, greater than or equal to 100 μm and less than or equal to 800 μm.

The air introduction layer 48 described above functions as a reference gas introduction section that introduces a reference gas (here, air) which serves as a reference for detecting the NOx concentration in a measurement-object gas, and allows the reference gas to flow to the reference electrode 42. The porosity of the air introduction layer 48 is, for instance, greater than or equal to 15% and less than or equal to 50%.

Next, an example of a manufacturing method for the gas sensor 100 will be described below. First, six uncalcined ceramic green sheets, which contain oxygen ion conductive solid electrolyte, such as zirconia, as ceramic content, are prepared. In the green sheets, multiple sheet holes and necessary through holes used for positioning at the time of printing or at the time of layering are formed. In addition, a green sheet for the spacer layer 5 is provided with space serving as a measurement-object gas flow section by performing punching processing or the like. For each of the first substrate layer 1, the second substrate layer 2, the third substrate layer 3, the first solid electrolyte layer 4, the spacer layer 5, and the second solid electrolyte layer 6, pattern print processing and dry processing are performed to form various patterns on a corresponding ceramic green sheet. Specifically, the patterns formed are, for instance, the above-described electrodes and the lead wires connected to the electrodes, the air introduction layer 48, and the heater unit 70. Pattern printing is performed by applying pattern forming paste onto a green sheet utilizing a known screen print technique, the pattern forming paste being prepared according to the characteristics required for an object to be formed. The dry processing is also performed using a known drying device. When the pattern printing and drying are completed, print and dry processing is performed on bonding paste for layering and bonding green sheets corresponding to the layers. The green sheets, on which bonding paste is formed, are positioned with the sheet holes, layered in a predetermined order, and pressure-bonded by applying predetermined temperature and pressure conditions. Thus, pressure-bonding processing is performed to obtain a single layered body. Thus obtained layered body includes multiple device bodies 101*a*. The layered body is cut and divided into pieces each having the size of the element body 101*a*. The divided layered body is calcined at a predetermined calcination temperature to obtain each device bodies 101*a*.

Subsequently, the porous protective layer 95 is formed in the element body 101*a* to obtain the sensor device 101. The porous protective layer 95 can be formed, for instance, using at least one of plasma spraying, screen printing, the gel-cast method, and dipping. When the porous protective layer 95 is formed by a process involving calcination, such as screen printing or dipping, the porous protective layer 95 before calcination may be formed in the element body 101*a* before calcination, and the sensor device 101 may be obtained by calcining both.

When the sensor device 101 is obtained in this manner, the sensor assembled body 140 (see FIG. 1) incorporating the sensor device 101 is manufactured, and the gas sensor 100 is obtained by mounting the protective cover 130 and a rubber stopper 157 on the sensor assembled body 140.

Here, the functions of the reference gas adjustment pump cell 90 will be described in detail. A measurement-object gas is introduced from the sensor device chamber 133 illustrated in FIG. 1 to the measurement-object gas flow section, such as gas introduction port 10, of the sensor device 101. In contrast, a reference gas (air) within the space 149 illustrated in FIG. 1 is introduced to the air introduction layer 48 of the sensor device 101. The sensor device chamber 133 and the space 149 are demarcated by the sensor assembled body 140 (particularly, the green pellets 145a, 145b), and sealed so that no gas flows from one to the other. However, a slight amount of gas may enter the space 149 from the sensor device chamber 133. Thus, when the oxygen concentration in the surroundings of the reference electrode 42 is reduced, the reference potential, which is the potential of the reference electrode 42, is changed. Thus, an electromotive force relative to the reference electrode 42, such as the electromotive force V2 of the oxygen partial pressure detection sensor cell 82 for measurement pump control, is changed, and the accuracy of detection of the NOx concentration in the measurement-object gas is reduced. The reference gas adjustment pump cell 90 has a function of decreasing such reduction of the accuracy of detection. The reference gas adjustment pump cell 90 carries the control current Ip3 (oxygen pumping current) by applying the control voltage Vp3 across the reference electrode 42 and the outer side pump electrode 23, thereby pumping oxygen from the surroundings of the outer side pump electrode 23 to the surroundings of the reference electrode 42. Thus, reduction of the oxygen concentration can be decreased by supplying the surroundings of the reference electrode 42 with oxygen, and reduction of the accuracy of detection can be decreased. As described above, the measurement-object gas in the sensor device chamber 133 is introduced to the surroundings of the outer side pump electrode 23 through the porous protective layer 95. Thus, the reference gas adjustment pump cell 90 pumps the oxygen in the measurement-object gas, which has reached the surroundings of the outer side pump electrode 23 through the porous protective layer 95, into the surroundings of the reference electrode 42.

In this embodiment, the ratio A/B is designed to be greater than or equal to 0.005, where A [µA] is the limiting current when oxygen is pumped from the surroundings of the outer side pump electrode 23 to the surroundings of the reference electrode 42 with the porous protective layer 95 exposed to an atmosphere having an oxygen concentration of 1000 ppm, and B [µA] is the limiting current when oxygen is pumped from the surroundings of the reference electrode 42 to the surroundings of the outer side pump electrode 23 with the air introduction layer 48 exposed to the air atmosphere. The ratio A/B is set to 0.005 or greater, and thus the amount of oxygen pumped by the reference gas adjustment pump cell 90 into the surroundings of the reference electrode 42 is unlikely to be insufficient. Consequently, in the gas sensor 100 of this embodiment, the oxygen concentration in the reference gas in the surroundings of the reference electrode 42 is unlikely to be reduced.

The measurement method for the limiting current A is as follows: First, the porous protective layer 95 of the sensor device 101 is exposed to an atmospheric gas having nitrogen as the base gas and an oxygen concentration of 1000 ppm. For instance, the gas sensor 100 is mounted on the pipe 190 as illustrated in FIG. 1, and the atmospheric gas is passed through the pipe 190. Thus, the front end portion, including the porous protective layer 95, of the sensor device 101 is exposed to the atmospheric gas. Although the oxygen concentration in the surroundings of the air introduction layer 48 essentially has no effect on any measurement value of the limiting current A, the rear end portion, including the air introduction layer 48, of the sensor device 101 is exposed to the air atmosphere. Next, the sensor device 101 is heated to a predetermined temperature (for instance, 800° C.) by energizing the heater 72. Each of the variable power supplies 25, 46, 52 and the power supply circuit 92 is in a state in which no voltage is applied thereto. After the temperature of the sensor device 101 becomes stable, the control voltage Vp3 is applied across the outer side pump electrode 23 and the reference electrode 42 so that oxygen is pumped from the surroundings of the outer side pump electrode 23 into the surroundings of the reference electrode 42. The control current Ip3 (oxygen pumping current) which flows between both electrodes 23, 42 at this time is measured. The control voltage Vp3 is assumed to be a DC voltage. Subsequently, as the control voltage Vp3 is gradually increased, the control current Ip3 is also gradually increased, but ultimately, even when the control voltage Vp3 is increased, the control current Ip3 is not increased and reaches an upper limit. The upper limit at this time is measured as the limiting current A. The flow volume of the gas which reaches the surroundings of the outer side pump electrode 23 through the measurement-object gas introduction section (here, the porous protective layer 95) depends on the diffusion resistance of the porous protective layer 95. More specifically, the flow volume of the gas which reaches the surroundings of the outer side pump electrode 23 depends on the diffusion resistance (hereinafter simply referred to as the "diffusion resistance of the porous protective layer 95") of the portion, which serves as a path of the gas from the outside to the outer side pump electrode 23, of the porous protective layer 95. What particularly has an effect on the diffusion resistance of the porous protective layer 95 is the diffusion resistance of the surrounding portion of the outer side pump electrode 23, such as the portion immediately above the outer side pump electrode 23, of the porous protective layer 95, for instance. The limiting current A has a negative correlation with the diffusion resistance of the porous protective layer 95, thus has a smaller value for a larger diffusion resistance. The limiting current A can be adjusted by changing the porosity of the porous protective layer 95, by changing the length (the thickness of the porous protective layer 95) of the gas in the flow direction from the outside of the sensor device 101 to the outer side pump electrode 23 of the porous protective layer 95, or by changing the cross-sectional area of the porous protective layer 95 when the porous protective layer 95 is cut by a plane perpendicular to the flow direction of the gas from the outside of the sensor device 101 to the outer side pump electrode 23 of the porous protective layer 95.

The measurement method for the limiting current B is as follows: First, the air introduction layer 48 is exposed to the air atmosphere. For instance, similarly to the above-described measurement method for the limiting current A, the gas sensor 100 is mounted on the pipe 190, and the rear end portion, which includes the air introduction layer 48, of the sensor device 101 is exposed to the air atmosphere. Although the oxygen concentration in the surroundings of the porous protective layer 95 essentially has no effect on any measurement value of the limiting current B, the inside of the pipe 190 is set in the air atmosphere, and the porous protective layer 95 is exposed to the air atmosphere. Next, the limiting current B is measured in the same manner in which the limiting current A is measured except that the control voltage Vp3 is applied so that oxygen is pumped from the surroundings of the reference electrode 42 to the surroundings of the outer side pump electrode 23. Specifically, even when the control voltage Vp3 is increased, the control current Ip3 (oxygen pumping current) is not increased and an upper limit of the control current Ip3 is reached, and the limiting current B is measured as the value of the upper limit. The flow volume of the gas which reaches the surroundings of the reference electrode 42 via the reference gas introduction section (here, the air introduction layer 48) depends on the diffusion resistance of the air introduction layer 48. Thus, the limiting current B has a negative correlation with the air introduction layer 48, and has a smaller value for a larger diffusion resistance. The limiting current B can be adjusted by changing the porosity of the air introduction layer 48, by changing the length of the gas in the flow direction (here, the front-back direction) from the outside of the sensor device 101 to the reference electrode 42 of the air introduction layer 48, or by changing the cross-sectional area of the air introduction layer 48 when the air introduction layer 48 is cut by a plane perpendicular to the flow direction of the gas from the outside of the sensor device 101 to the reference electrode 42 of the air introduction layer 48.

Here, when the limiting current A is too small, in other words, the diffusion resistance of the porous protective layer 95 is too high, it is difficult for the measurement-object gas to reach the surroundings of the outer side pump electrode 23, thus the oxygen in the surroundings of the outer side pump electrode 23 is likely to be insufficient. In this case, the reference gas adjustment pump cell 90 may not be able to pump a sufficient amount of oxygen in the surroundings of the reference electrode 42. Also, when the limiting current is too large, in other words, the diffusion resistance of the air introduction layer 48 is too high, the oxygen pumped into the surroundings of the reference electrode 42 by the reference gas adjustment pump cell 90 is likely to flow to the outside via the air introduction layer 48, the oxygen concentration in the surroundings of the reference electrode 42 may not be maintained. To cope with this, in the gas sensor 100 in this embodiment, the ratio A/B is greater than or equal to 0.005, thus the diffusion resistance of the porous protective layer 95 is not too high, and the diffusion resistance of the air introduction layer 48 is not too low. Thus, the oxygen concentration in the surroundings of the reference electrode 42 is unlikely to be reduced.

As described above, the limiting current A is measured in an atmosphere having an oxygen concentration of 1000 ppm (=0.1%), and the limiting current B is measured in an atmosphere (oxygen concentration is 20.5%). Thus, when the diffusion resistance of the porous protective layer 95 is equal to the diffusion resistance of the air introduction layer 48, the ratio A/B=(0.1%)/(20.5%), which is approximately 0.005. In other words, the ratio A/B greater than equal to 0.005 means that the diffusion resistance of the porous protective layer 95 is less than or equal to the diffusion resistance of the air introduction layer 48. The ratio A/B is preferably greater than equal to 0.4. In that case, the oxygen concentration in the surroundings of the reference electrode 42 is more unlikely to be reduced.

When the limiting current A is relatively large, in other words, the diffusion resistance of the porous protective layer 95 is relatively low, if the limiting current B is too small, in other words, the diffusion resistance of the air introduction layer 48 is too high, the oxygen pumped into the surroundings of the reference electrode 42 is excessively accumulated, and the oxygen concentration in the surroundings of the reference electrode 42 may become too high. Thus, the ratio A/B is preferably less than or equal to 125, and more preferably less than or equal to 25.

The limiting current A is preferably 1 μA to 10000 μA. When the limiting current A is greater than or equal to 1 μA, it is easy to adjust the ratio A/B to 0.005 or higher. When the limiting current A is less than or equal to 10000 μA, it is easy to adjust the ratio A/B to 125 or lower. The limiting current A may be greater than or equal to 10 μA, or may be greater than or equal to 20 μA. The limiting current A may be less than or equal to 1000 μA, may be less than or equal to 500 μA, or may be less than or equal to 400 μA.

The limiting current B is preferably 8 μA to 200 μA. The limiting current B may be greater than or equal to 10 μA, or may be greater than or equal to 20 μA. The limiting current B may be less than or equal to 100 μA, or may be less than or equal to 80 μA.

Let C [mm$^2$] be the area of the outer side pump electrode 23, D [mm$^2$] be the area of the reference electrode 42, then it is preferable that at least one of the following three conditions be satisfied. The area C is greater than or equal to 1.0 mm$^2$, the area D is greater than or equal to 0.5 mm$^2$, and the ratio C/D is greater than or equal to 1 and less than or equal to 20. It is more preferable that all of three conditions be satisfied. The area C of the outer side pump electrode 23 is the area (here, the area of the upper surface of the outer side pump electrode 23) as viewed in a direction perpendicular to the surface (here, the upper surface of the second solid electrolyte layer 6) on which the outer side pump electrode 23 is disposed. The area D of the reference electrode 42 is the area (here, the area of the upper surface of the reference electrode 42) as viewed in a direction perpendicular to the surface (here, the upper surface of the first solid electrolyte layer 4) on which the reference electrode 42 is disposed. Here, the area C has a negative correlation with the resistance value of the outer side pump electrode 23. Also, the area D has a negative correlation with the resistance value of the reference electrode 42. Since the area C is greater than or equal to 1.0 mm$^2$, the resistance value of the outer side pump electrode 23 is not too high. Since the area D is greater than or equal to 0.5 mm$^2$, the resistance value of the reference electrode 42 is not too high. Since the ratio C/D is greater than or equal to 1, the resistance value of the outer side pump electrode 23 is not too high relative to the resistance value of the reference electrode 42. Since the ratio C/D is less than or equal to 20, the resistance value of the reference electrode is not too high relative to the resistance value of the measurement-object gas-side electrode. Therefore, when the area C is greater than or equal to 1.0 mm$^2$, the area D is greater than or equal to 0.5 mm$^2$, and the ratio C/D is greater than or equal to 1 and less than or equal to 20, it is easy from the reference gas adjustment pump cell 90 to carry an appropriate control current Ip3 (oxygen pumping current).

The area C is preferably greater than or equal to 1.0 mm$^2$ and less than or equal to 15.0 mm$^2$. When the area C is greater than or equal to 1.0 mm$^2$, it is easy to adjust the ratio C/D to 1 or greater. When the area C is less than or equal to 15.0 mm$^2$, it is easy to adjust the ratio C/D to 20 or less.

The area D is preferably greater than or equal to 0.5 mm$^2$ and less than or equal to 4.0 mm$^2$. When the area D is greater than or equal to 0.5 mm$^2$, it is easy to adjust the ratio C/D to 20 or less. When the area D is less than or equal to 4.0 mm$^2$, it is easy to adjust the ratio C/D to 1 or greater.

Also, as the area D of the reference electrode 42 is increased, the electrostatic capacitance between the reference electrode 42 and another electrode is increased. Thus, when the area D of the reference electrode 42 is too large, in the case where the electromotive forces V0, V1, V2, which are measured relative to the reference electrode 42, are changed, it takes a longer time for each voltage to become stable, thus the responsiveness of the sensor device 101 may be reduced. Also, in this respect, the area D is preferably less than or equal to 4.0 mm$^2$.

The thickness of the outer side pump electrode 23 is, for instance, greater than or equal to 10 μm and less than or equal to 40 μm. The thickness of the reference electrode 42 is, for instance, greater than or equal to 10 μm and less than or equal to 40 μm. The outer side pump electrode 23 and the reference electrode 42 are each a thin flat plate-shaped electrode, thus the above-described areas C, D have more effect on the performance of the sensor device 101 than the thickness. However, in addition to setting the ratio C/D to 1 or greater, it is also preferable that a ratio E/F be set to 1 or greater, where E is the volume of the outer side pump electrode 23 and F is the volume of the reference electrode 42.

The control current Ip3 (oxygen pumping current) carried by the reference gas adjustment pump cell 90 can be determined in advance so that the oxygen concentration in the surroundings of the reference electrode 42 can be maintained at an appropriate value (for instance, the air atmosphere, that is, the oxygen concentration is 20.5%). For instance, let P [μA] be the average value of the control current (oxygen pumping current) Ip3, then the ratio B/P may be designed to be 0.8 to 10. The average value P may be 1 to 30 μA. The higher the limiting current B is, oxygen is more likely to remain in the surroundings of the reference electrode 42. Thus, the oxygen concentration in the surroundings of the reference electrode 42 is easily maintained at an appropriate value by setting the average value P according to the limiting current B. Also, when the limiting current A is too small even with setting of an appropriate average value P, in other words, when the diffusion resistance of the porous protective layer 95 is too high, the oxygen in the surroundings of the outer side pump electrode 23 may become insufficient as time passes, and the average value of the control current Ip3 may become smaller than a predetermined value (average value P). However, in the gas sensor 100 of this embodiment, since the ratio A/B is greater than or equal to 0.005, the oxygen in the surroundings of the outer side pump electrode 23 is unlikely to be insufficient. Thus, even when oxygen is pumped by the reference gas adjustment pump cell 90 for a long time, the average value of the control current Ip3 is likely to be maintained at a predetermined value (average value P).

Here, the correspondence relationship between the components of this embodiment and the components of the present invention will be clarified. The element body 101a of this embodiment corresponds to the element body of the present invention, the measurement electrode 44 corresponds to the measurement electrode, the outer side pump electrode 23 corresponds to the measurement-object gas-side electrode, the reference electrode 42 corresponds to the reference electrode, the porous protective layer 95 corresponds to the measurement-object gas introduction section, the air introduction layer 48 corresponds to the reference gas introduction layer, the pump cell 41 for measurement corresponds to the detection device, and the reference gas adjustment pump cell 90 corresponds to the reference gas adjustment device.

With the gas sensor 100 of this embodiment described in detail above, the reference gas adjustment pump cell 90 pumps oxygen into the surroundings of the reference electrode 42, thus it is possible to compensate for the reduction of the oxygen concentration in the surroundings of the reference electrode 42. Also, since the ratio A/B is greater than or equal to 0.005, the diffusion resistance of the porous protective layer 95 is not too high, and the diffusion resistance of the air introduction layer 48 is not too low. Thus, the oxygen concentration of the reference gas in the surroundings of the reference electrode 42 is unlikely to be reduced.

In addition, since the ratio A/B is greater than equal to 0.4, the oxygen concentration in the reference gas in the surroundings of the reference electrode 42 is unlikely to be reduced. Also, since the ratio A/B is less than equal to 125, it is possible to suppress excessive oxygen concentration in the reference gas in the surroundings of the reference electrode, the excessive oxygen concentration being caused by excessively accumulated oxygen pumped into the surroundings of the reference electrode.

In addition, since the limiting current A is 1 μA to 10000 μA, it is easy to adjust the ratio A/B to 0.005 or greater and 125 or less. Since the limiting current B is 8 μA to 200 μA, it is easy to adjust the ratio A/B to 0.005 or greater and 125 or less.

In addition, since the area C is greater than or equal to 1.0 mm$^2$, the area D is greater than or equal to 0.5 mm$^2$, and the ratio C/D is greater than or equal to 1 and less than or equal to 20, the reference gas adjustment pump cell 90 easily carries an appropriate control current Ip3 (oxygen pumping current). Also, since the area C is less than or equal to 15.0 mm$^2$, it is easy to adjust the ratio C/D to 20 or less. Since the area D is less than or equal to 4.0 mm$^2$, it is easy to adjust the ratio C/D to 1 or greater.

It is to be noted that the present invention is not limited to the above-described embodiment. Needless to say, the present invention may be carried out in various modes within the technical scope of the present invention.

For instance, in the embodiment described above, the reference gas adjustment pump cell 90 may pump oxygen into the surroundings of the reference electrode 42 by carrying a pulse current as the control current (oxygen pumping current) Ip3 between the reference electrode 42 and the outer side pump electrode 23, pulse current being turned on and off with a predetermined period. The pump cell 41 for measurement may detect the NOx gas concentration in the measurement-object gas during a time period when the control current (oxygen pumping current) Ip3 is off. In this way, since the control current (oxygen pumping current) Ip3 is off when the NOx gas concentration in the measurement-object gas is detected, it is possible to reduce the decrease in the accuracy of detection of the NOx gas concentration due to the control current (oxygen pumping current) Ip3. It is to be noted that even in a time period when the control current (oxygen pumping current) Ip3 is off, the current value is not necessarily zero because of the electrostatic capacitance between the reference electrode 42 and the outer side pump electrode 23.

Figure 3:
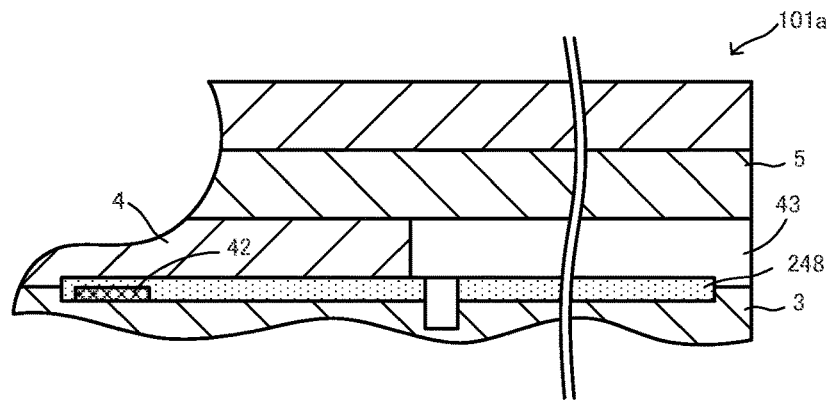
FIG. 3 is a schematic cross-sectional view illustrating the configuration of the surroundings of an air introduction layer 248.

In the embodiment described above, the reference gas introduction section includes only the air introduction layer 48, however, this is not always the case. The reference gas introduction section refers to a section that introduces the reference gas, and allows the gas to flow to the reference electrode 42. For instance, instead of the air introduction layer 48, an air introduction layer 248 illustrated in FIG. 3 may be adopted. In FIG. 3, a hollow 43 is inwardly provided in the rear end face of the element body 101a, and the upper surface of the porous air introduction layer 248 is exposed to the hollow 43. The hollow 43 is formed in its shape by notching the first solid electrolyte layer 4 inserted between the third substrate layer 3 and the spacer layer 5 from the rear end face. In the example of FIG. 3, the hollow 43 and the air introduction layer 248 correspond to the reference gas introduction section. Thus, not only the air introduction layer 248, but also the shape of the hollow 43 has an effect on the limiting current B.

In the embodiment described above, the outer side pump electrode 23 as the outer electrode of the pump cell 41 for measurement also serves as the measurement-object gas-side electrode of the reference gas adjustment pump cell 90, however, this is not always the case. The outer electrode of the pump cell 41 for measurement and the measurement-object gas-side electrode of the reference gas adjustment pump cell 90 may be separately formed outside the element body 101a. Also, the measurement-object gas-side electrode of the reference gas adjustment pump cell 90 is not necessarily disposed outside of the sensor body 101a as long as the measurement-object gas-side electrode is disposed in a portion of the sensor device 101, the portion being exposed to the measurement-object gas. For instance, the measurement-object gas-side electrode may be disposed within the measurement-object gas distribution section. For instance, the inner side pump electrode 22 may also serves as the measurement-object gas-side electrode of the reference gas adjustment pump cell 90. In this case, the diffusion resistance of the porous protective layer 95 (particularly, a portion of the porous protective layer 95, the portion serving as the path for the gas from the outside to the gas introduction port 10), and the path (specifically, the first diffusion control section 11, the buffer space 12, and the second diffusion control section 13, and the first internal space 20) for the gas from the gas introduction port 10 to the inner side pump electrode 22 of the measurement-object gas distribution section correspond to the measurement-object gas distribution section. Therefore, for instance, the shapes of the first diffusion control section 11 and the second diffusion control section 13 also have an effect on the limiting current A. In this way, the measurement-object gas introduction section means not only the porous protective layer 95, but also a section that introduces the measurement-object gas, and allows the gas to flow to the measurement-object gas-side electrode.

Figure 4:
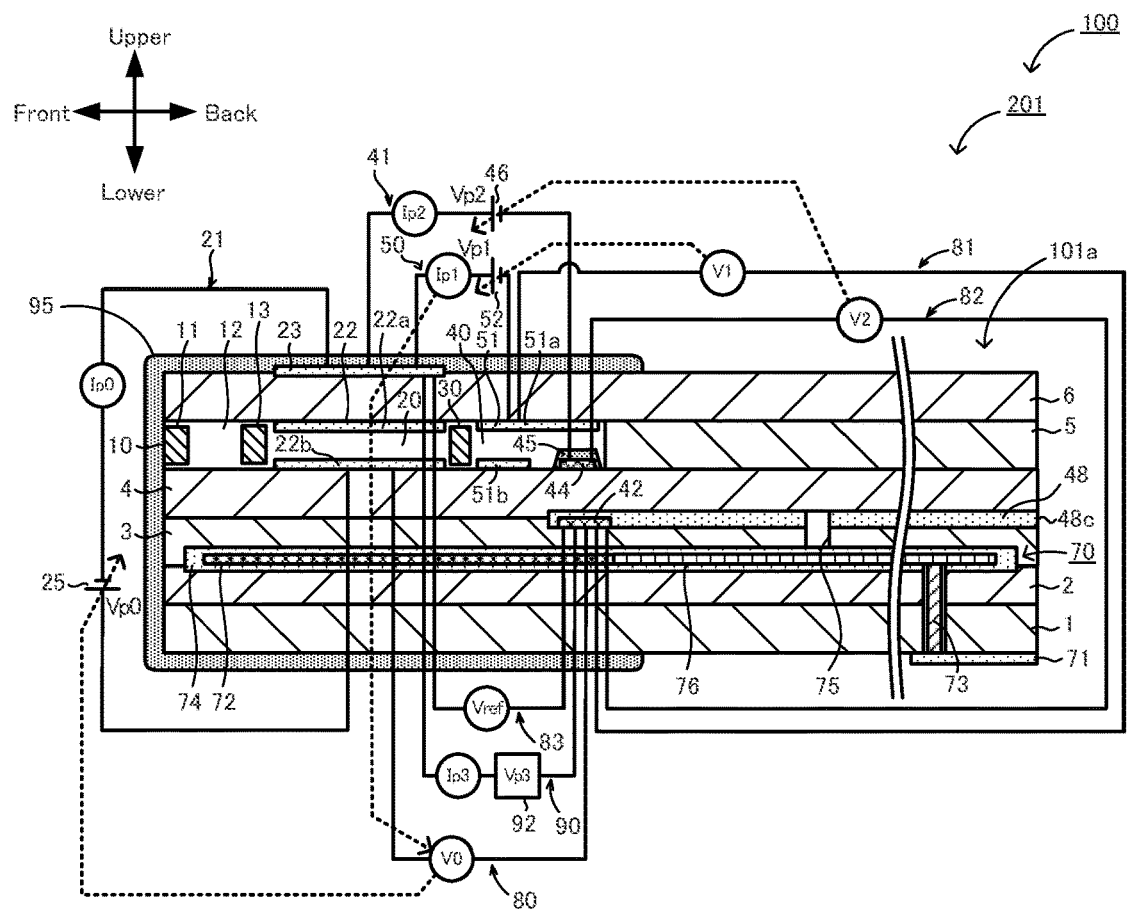
FIG. 4 is a schematic cross-sectional view of a sensor device 201 in a modification.

In the embodiment described above, the sensor device 101 of the gas sensor 100 includes the first internal space 20, the second internal space 40, and the third internal space 61, however, this is not always the case. For instance, the sensor device 101 may not include the third internal space 61 as in a sensor device 201 of FIG. 4. In the sensor device 201 in a modification illustrated in FIG. 4, between the lower surface of the second solid electrolyte layer 6 and the upper surface of the first solid electrolyte layer 4, the gas introduction port 10, the first diffusion control section 11, the buffer space 12, the second diffusion control section 13, the first internal space 20, the third diffusion control section 30, and the second internal space 40 are adjacently formed in a manner allowing communication with each other in that order. Also, the measurement electrode 44 is disposed on the upper surface of the first solid electrolyte layer 4 in the second internal space 40. The measurement electrode 44 is covered by a diffusion control section 45. The diffusion control section 45 is a film composed of a ceramic porous material such as alumina ($Al_2O_3$). Similarly to the fourth diffusion control section 60 of this embodiment described above, the diffusion control section 45 has a function of limiting the amount of NOx which flows into the measurement electrode 44. Also, the diffusion control section 45 functions as a protective film for the measurement electrode 44. The ceiling electrode section 51a of the auxiliary pump electrode 51 is formed up to a position immediately above the measurement electrode 44. Even with the sensor device 201 in this configuration, the NOx concentration can be detected by the pump cell 41 for measurement in the same manner as in the embodiment described above.

In the embodiment described above, the voltage Vp2 of the variable power supply 46 is controlled so that the control voltage (electromotive force) V2 detected by the oxygen partial pressure detection sensor cell 82 for measurement pump control is constant, and the nitrogen oxide concentration in the measurement-object gas is calculated using the pump current Ip2 at that time. However, this is not always the case as long as a specific concentration in the measurement-object gas is detected based on the voltage between the reference electrode 42 and the measurement electrode 44. For instance, when an oxygen partial pressure detection device is configured as an electrochemical sensor cell by combining the measurement electrode 44, the first solid electrolyte layer 4, the third substrate layer 3, and the reference electrode 42, it is possible to detect an electromotive force according to the difference between the amount of oxygen generated by reduction of the NOx content in the atmosphere in the surroundings of the measurement electrode 44 and the amount of oxygen contained in the reference gas. Thus, the concentration of the NOx content in the measurement-object gas can be determined. In this case, the electrochemical sensor cell corresponds to the detection device of the present invention.

In the embodiment described above, the reference electrode 42 is directly formed on the upper surface of the third substrate layer 3, however, this is not always the case. For instance, the reference electrode 42 may be directly formed on the lower surface of the first solid electrolyte layer 4.

In the embodiment described above, the reference gas is air. However, this is not always the case as long as the reference gas serves as a reference for detection of the concentration of a specific gas in the measurement-object gas. For instance, a gas having an adjusted predetermined oxygen concentration (>the oxygen concentration in the measurement-object gas) may fill the space 149 as a reference gas.

In the embodiment described above, the sensor device 101 detects the NOx concentration in the measurement-object gas. However, this is not always the case as long as the sensor device 101 detects the concentration of a specific gas in the measurement-object gas. For instance, the oxygen concentration or the ammonia concentration in the measurement-object gas may be detected.

EMBODIMENT

Hereinafter an example in which the gas sensor is specifically manufactured will be described as an embodiment. It is to be noted that the present invention is not limited to the embodiment below.

Experimental Example 1

The gas sensor 100 illustrated in FIGS. 1, 2 was manufactured by the above-described manufacturing method, which is named as experimental example 1. When the sensor device 101 was manufactured, zirconia particles with 4 mol % of yttria serving as a stabilizing agent added, an organic binder, and an organic solvent were mixed, and the green sheets were formed by tape casting. The green pellets 145a, 145b of FIG. 1 were obtained by molding talc particles. The porous protective layer 95 and the air introduction layer 48 are alumina porous materials. The porous protective layer 95 was formed by plasma spraying. The degrees of porosity of the porous protective layer 95 and the air introduction layer 48 were each 20%. The area C of the outer side pump electrode 23 was set to 7.50 $mm^2$, and the area D of the reference electrode 42 was set to 1.85 mm². The ratio C/D was 4.05. The thicknesses of the outer side pump electrode 23 and the air introduction layer 48 were each 20 μm. When the limiting currents A, B were measured in accordance with the above-described measurement method, the limiting current A was 500 μA, the limiting current B was 20 μA, and the ratio A/B was 25.0.

Experimental Examples 2 to 11

The gas sensor 100 was produced in the same manner as in Experimental Example 1 except that the limiting currents A, B were set as illustrated in Table 1, and Experimental Examples 2 to 11 were obtained.

Experimental Examples 12 to 15

The gas sensor 100 was produced in the same manner as in Experimental Example 1 except that the ratio A/B was fixed to 0.40 and the limiting currents A, B were set as illustrated in Table 2, and Experimental Examples 12 to 15 were obtained. Experimental Example 4 is also listed again in Table 2.

Experimental Examples 16 to 23

The gas sensor 100 was produced in the same manner as in Experimental Example 1 except that the ratio A/B was fixed to 25.0, the limiting currents A, B, the areas C, D, the thickness E of the outer side pump electrode 23, and the thickness F of the reference electrode 42 were set as illustrated in Table 3, and Experimental Examples 16 to 23 were obtained. Experimental Example 1 is also listed again in Table 3.

[Evaluation of Accuracy of Detection]

The gas sensor in Experimental Example 1 was mounted on a pipe. The temperature was set to 800° C. by energizing the heater 72, and the sensor device 101 was heated. The control voltage Vp3 applied by the power supply circuit 92 of the reference gas adjustment pump cell 90 was set to a pulse voltage (duty ratio of 20%) having a period T of 10 msec, ON-time Ton of 2 msec, and OFF-time Toff of 8 msec. The control voltage Vp3 applied by the power supply circuit 92 was set so that the control current Ip3 (oxygen pumping current) which flows through the reference electrode 42 at the time voltage ON is 20 μA. The average value P of the control current Ip3 is 4 μA(=20 μA×20%). In this state, a model gas having nitrogen as the base gas, an oxygen concentration of 10%, and NOx concentration of 500 ppm was prepared, and passed to the pipe as the measurement-object gas. This state was maintained for 20 minutes, and the electromotive force Vref during the time was measured. Measurement was made similarly in Experimental Examples 2 to 23. However, the control voltage Vp3 in Experimental Examples 16 to 23 was set to the same value as the control voltage Vp3 set in Experimental Example 1. Specifically, in each of Experimental Examples 1 to 15, the average value P of the control current Ip3 was 4 μA, however in Experimental Examples 16 to 23, the average value P of the control current Ip3 was changed according to the resistance values of the outer side pump electrode 23 and the reference electrode 42. Also, in each of Experimental Examples 1 to 23, when the oxygen in the surroundings of the outer side pump electrode 23 decreases as time passes, the average value P of the control current Ip3 was reduced.

As the oxygen concentration in the surroundings of the reference electrode 42 becomes higher than the oxygen concentration in the air, the electromotive force Vref tends to increase from the value at the start of measurement as time passes. As the electromotive force Vref is increased, the pump current Ip2 tends to decrease from a proper value (value corresponding to the NOx concentration 500 ppm). In contrast, as the oxygen concentration in the surroundings of the reference electrode 42 becomes lower than the oxygen concentration in the air, the electromotive force Vref tends to decrease from the value at the start of measurement as time passes. As the electromotive force Vref is decreased, the pump current Ip2 tends to increase from the proper value.

Thus, the value of the electromotive force Vref at the start of measurement is assumed to be 100%, and when a measured electromotive force Vref is within a predetermined range (80% or greater and 120% or less) even when 20 minutes has elapsed, it is determined that the accuracy of detection of NOx concentration is significantly high ("A"). When a measured electromotive force Vref was out of the predetermined range after 15 minutes has elapsed and before 20 minutes elapsed, it is determined that the accuracy of detection of NOx concentration is high ("B"). When a measured electromotive force Vref was out of the predetermined range before 15 minutes elapsed, it is determined that the accuracy of detection of NOx concentration is low ("F").

The results of the above-described evaluation experiments are illustrated in Tables 1 to 3. In each of Table 1 to 3, there was no Experimental Example in which the electromotive force Vref exceeded the upper limit of the predetermined range. In other words, in each of Experimental Examples in Tables 1 and 3 where the determination was B or F, the electromotive force Vref was lower than the lower limit of the predetermined range, and was out of the predetermined range.

TABLE 1

|  | Limiting Current A [μA] | Limiting Current B [μA] | Ratio A/B | Determination |
|---|---|---|---|---|
| Experimental Example 1 | 500 | 20 | 25.0 | A |
| Experimental Example 2 | 10000 | 80 | 125.0 | A |
| Experimental Example 3 | 20 | 20 | 1.0 | A |
| Experimental Example 4 | 10 | 25 | 0.40 | A |
| Experimental Example 5 | 400 | 30 | 13.3 | A |
| Experimental Example 6 | 18 | 50 | 0.36 | B |
| Experimental Example 7 | 10 | 65 | 0.15 | B |
| Experimental Example 8 | 5 | 100 | 0.05 | B |
| Experimental Example 9 | 1.0 | 200 | 0.005 | B |
| Experimental Example 10 | 1.0 | 300 | 0.003 | F |
| Experimental Example 11 | 1.0 | 500 | 0.002 | F |

TABLE 2

| | Limiting Current A [μA] | Limiting Current B [μA] | Ratio A/B | Determination |
|---|---|---|---|---|
| Experimental Example 4 | 10 | 25 | 0.40 | A |
| Experimental Example 12 | 20 | 50 | 0.40 | A |
| Experimental Example 13 | 6 | 15 | 0.40 | A |
| Experimental Example 14 | 30 | 75 | 0.40 | A |
| Experimental Example 15 | 50 | 125 | 0.40 | A |

TABLE 3

| | Limiting Current A [μA] | Limiting Current B [μA] | Ratio A/B | Area C [mm²] | Area D [mm²] | Ratio C/D | Thickness E [μm] | Thickness F [μm] | Determination |
|---|---|---|---|---|---|---|---|---|---|
| Experimental Example 1 | 500 | 20 | 25.0 | 7.5 | 1.85 | 4.05 | 20 | 20 | A |
| Experimental Example 16 | 1000 | 40 | 25.0 | 7.5 | 1.85 | 4.05 | 40 | 40 | A |
| Experimental Example 17 | 200 | 8 | 25.0 | 7.5 | 1.85 | 4.05 | 10 | 10 | A |
| Experimental Example 18 | 500 | 20 | 25.0 | 3.0 | 3.0 | 1.00 | 20 | 20 | A |
| Experimental Example 19 | 500 | 20 | 25.0 | 15.0 | 4.0 | 3.75 | 20 | 20 | A |
| Experimental Example 20 | 500 | 20 | 25.0 | 1.0 | 1.0 | 1.00 | 20 | 20 | B |
| Experimental Example 21 | 500 | 20 | 25.0 | 8.0 | 0.5 | 16.00 | 20 | 20 | B |
| Experimental Example 22 | 500 | 20 | 25.0 | 1.0 | 0.7 | 1.43 | 20 | 20 | B |
| Experimental Example 23 | 500 | 20 | 25.0 | 2.0 | 3.0 | 0.67 | 20 | 20 | B |

As shown in Table 1 to 3, when the ratio A/B is greater than or equal to 0.005, the evaluation was "A" or "B", and the accuracy of detection of NOx concentration was high (Experimental Examples 1 to 9, 12 to 15, 16 to 23). On the other hand, when the ratio A/B is less than 0.005, the evaluation was "F", and the accuracy of detection of NOx concentration was low (Experimental Examples 10, 11). Also, as seen from the result of Table 1 in which the same conditions are applied except for the limiting currents A, B, when the ratio A/B is greater than or equal to 0.4, the evaluation was "A", and the accuracy of detection of NOx concentration was significantly high (Experimental Examples 1 to 5). Also, as seen from the result of Table 2 in which the ratio A/B is fixed and the limiting currents A, B are changed, even with different values of the limiting currents A, B, when the ratio A/B has the same value, the accuracy of detection of NOx concentration was nearly the same (Experimental Examples 4, 12 to 15). From this result, the ratio A/B rather than the values of the limiting currents probably has more effect on the accuracy of detection of NOx concentration. Also, when the ratio A/B is less than or equal to 125, the electromotive force Vref does not exceed the upper limit of the predetermined range, in other words, the oxygen concentration of the reference gas in the surroundings of the reference electrode 42 does not become too high (Experimental Examples 1 to 23).

Also, as shown in Table 3, when the area C is greater than or equal to 1.0 mm² and less than or equal to 15.0 mm², the area D is greater than or equal to 0.5 mm² and less than or equal to 4.0 mm², and the ratio C/D is greater than or equal to 1 and less than or equal to 20 (Experimental Examples 1, 16 to 22), for greater values of the area C, the area D, the ratio C/D, the accuracy of detection of NOx concentration tends to be higher. For instance, in Experimental Examples 18, 20 to 22, at least one of the area C, the area D, and the ratio C/D has the same value as the lower limit of the above-mentioned range, in Experimental Examples 20 to 22 among these, the evaluation was "B". In contrast, in Experimental Examples 1, 16, 17, 19, each of the area C, the area D, and the ratio C/D has a value higher than the lower limit of the above-mentioned range, and the evaluation for each was "A". Also, in Experimental Example 23 in which the ratio C/D falls below the range of 1 or greater and 20 or less, the evaluation was "B". Although the evaluation for Experimental Example 23 is the same "B" for Experimental Examples 20 to 22, a time taken for a measured electromotive force Vref to deviate from the predetermine range is shorter than in Experimental Examples 20 to 22. In other words, in Experimental Example 23, the accuracy of detection of NOx concentration is high, however, is reduced as compared with Experimental Examples 1, 16 to 22 in which the ratio C/D is greater than or equal to 1 and less than or equal to 20.

It is to be noted that Experimental Examples 1 to 9, 12 to 23 correspond to the embodiments of the present invention, and Experimental Examples 10, 11 correspond to a comparative example.

What is claimed is:

1. A gas sensor comprising:
   an element body having an oxygen ion conductive solid electrolyte layer and provided with a gas introduction port through which a measurement-object gas flows to a measurement chamber;
   a measurement electrode disposed on an inner surface of the measurement chamber;
   a measurement-object gas-side electrode disposed with respect to a portion of the element body so as to be exposed to the measurement-object gas;
   a reference electrode disposed inside of the element body;
   a porous protective layer that covers part of the element body and allows the measurement-object gas to flow to the measurement-object gas-side electrode with a first predetermined diffusion resistance;

a reference gas introduction section that has a reference gas introduction layer, and introduces a reference gas serving as a reference for detection of a specific gas concentration in the measurement-object gas, and allows the reference gas to flow to the reference electrode with a second predetermined diffusion resistance;

a measurement pump cell that detects the specific gas concentration in the measurement-object gas based on a pump current when pumping oxygen in surroundings of the measurement electrode based on an electromotive force generated between the reference electrode and the measurement electrode;

a reference gas adjustment pump cell that carries an oxygen pumping current between the reference electrode and the measurement-object gas-side electrode, and pumps oxygen from surroundings of the measurement-object gas-side electrode into surroundings of the reference electrode, wherein amounts of the first predetermined diffusion resistance and the second predetermined diffusion resistance determine a ratio A/B, wherein A[μA] is a limiting current when oxygen is pumped from the surroundings of the measurement-object gas-side electrode to the surroundings of the reference electrode with the porous protective layer exposed to an atmosphere having an oxygen concentration of 1000 ppm, and B[μA] is a limiting current when oxygen is pumped from the surroundings of the reference electrode to the surroundings of the measurement-object gas-side electrode with the reference gas introduction section exposed to an air atmosphere, and wherein the ratio A/B is predetermined to be greater than or equal to 0.005.

2. The gas sensor according to claim 1,
wherein the ratio A/B is greater than or equal to 0.4.

3. The gas sensor according to claim 2,
wherein the limiting current A is 1 μA to 10000 μA.

4. The gas sensor according to claim 2, wherein the limiting current B is 8 μA to 200 μA.

5. The gas sensor according to claim 2,
wherein let C[mm$^2$] be an area of the measurement-object gas-side electrode, and D[mm$^2$] be an area of the reference electrode, then the area C is greater than or equal to 1.0 mm$^2$, the area D is greater than or equal to 0.5 mm$^2$, and a ratio C/D is greater than or equal to 1 and less than or equal to 20.

6. The gas sensor according to claim 5,
wherein the area C is less than or equal to 15.0 mm$^2$.

7. The gas sensor according to claim 5,
wherein the area D is less than or equal to 4.0 mm$^2$.

8. The gas sensor according to claim 1,
wherein the ratio A/B is less than or equal to 125.

9. The gas sensor according to claim 8,
wherein the limiting current A is 1 μA to 10000 μA.

10. The gas sensor according to claim 8,
wherein the limiting current B is 8 μA to 200 μA.

11. The gas sensor according to claim 8,
wherein let C[mm$^2$] be an area of the measurement-object gas-side electrode, and D[mm$^2$] be an area of the reference electrode, then the area C is greater than or equal to 1.0 mm$^2$, the area D is greater than or equal to 0.5 mm$^2$, and a ratio C/D is greater than or equal to 1 and less than or equal to 20.

12. The gas sensor according to claim 11,
wherein the area C is less than or equal to 15.0 mm$^2$.

13. The gas sensor according to claim 11,
wherein the area D is less than or equal to 4.0 mm$^2$.

14. The gas sensor according to claim 1,
wherein the limiting current A is 1 μA to 10000 μA.

15. The gas sensor according to claim 1,
wherein the limiting current B is 8 μA to 200 μA.

16. The gas sensor according to claim 1,
wherein let C[mm$^2$] be an area of the measurement-object gas-side electrode, and D[mm$^2$] be an area of the reference electrode, then the area C is greater than or equal to 1.0 mm$^2$, the area D is greater than or equal to 0.5 mm$^2$, and a ratio C/D is greater than or equal to 1 and less than or equal to 20.

17. The gas sensor according to claim 16,
wherein the area C is less than or equal to 15.0 mm$^2$.

18. The gas sensor according to claim 16,
wherein the area D is less than or equal to 4.0 mm$^2$.

19. The gas sensor according to claim 1, wherein
a porosity of the porous protective layer is greater than or equal to 20% and less than or equal to 60%, and
a porosity of the reference gas introduction layer is greater than or equal to 15% and less than or equal to 50%.

20. A gas sensor comprising:
an element body having an oxygen ion conductive solid electrolyte layer and provided with a gas introduction port into which a measurement-object gas flows and a measurement-object gas distribution section that communicates with the gas introduction port and a measurement chamber;

a measurement electrode disposed on an inner surface of the measurement chamber;

a measurement-object gas-side electrode disposed in a portion of the element body so as to be exposed to the measurement-object gas;

a reference electrode disposed inside of the element body;

a porous protective layer that covers part of the element body and allows the measurement-object gas to flow through the gas introduction port into the measurement-object gas distribution section in which the measurement-object gas-side electrode is disposed, the measurement-object gas flowing to the measurement-object gas-side electrode with a first predetermined diffusion resistance;

a reference gas introduction section that has a reference gas introduction layer, and introduces a reference gas serving as a reference for detection of a specific gas concentration in the measurement-object gas, and allows the reference gas to flow to the reference electrode with a second predetermined diffusion resistance;

a measurement pump cell that detects the specific gas concentration in the measurement-object gas based on a pump current when pumping oxygen in surroundings of the measurement electrode based on an electromotive force generated between the reference electrode and the measurement electrode;

a reference gas adjustment pump cell that carries an oxygen pumping current between the reference electrode and the measurement-object gas-side electrode, and pumps oxygen from surroundings of the measurement-object gas-side electrode into surroundings of the reference electrode, wherein amounts of the first predetermined diffusion resistance and the second predetermined diffusion resistance determine a ratio A/B, wherein A[μA] is a limiting current when oxygen is pumped from the surroundings of the measurement-object gas-side electrode to the surroundings of the reference electrode with the porous protective layer exposed to an atmosphere having an oxygen concentration of 1000 ppm, and B[μA] is a limiting current when oxygen is pumped from the surroundings of the reference electrode to the surroundings of the measurement-object gas-side electrode with the reference gas introduction section exposed to an air atmosphere, and wherein the ratio NB is predetermined to be greater than or equal to 0.005.

* * * * *